(12) United States Patent
Deng et al.

(10) Patent No.: US 12,507,873 B2
(45) Date of Patent: Dec. 30, 2025

(54) AUTOCLAVABLE ENDOSCOPE FOR ENDOSCOPIC IMAGING SYSTEMS

(71) Applicant: Stryker Corporation, Kalamazoo, MI (US)

(72) Inventors: Wenjie Deng, San Jose, CA (US); Candice Pack, San Jose, CA (US); Michelle Sun, San Jose, CA (US)

(73) Assignee: Stryker Corporation, Portage, MI (US)

( * ) Notice: Subject to any disclaimer, the term of this patent is extended or adjusted under 35 U.S.C. 154(b) by 1044 days.

(21) Appl. No.: 17/558,566

(22) Filed: Dec. 21, 2021

(65) Prior Publication Data

US 2022/0192473 A1 Jun. 23, 2022

Related U.S. Application Data

(60) Provisional application No. 63/130,344, filed on Dec. 23, 2020.

(51) Int. Cl.
*A61B 1/00* (2006.01)
*A61B 17/34* (2006.01)

(52) U.S. Cl.
CPC ...... *A61B 1/00188* (2013.01); *A61B 1/00117* (2013.01); *A61B 1/00121* (2013.01); *A61B 1/00197* (2013.01); *A61B 17/3478* (2013.01); *A61B 17/3496* (2013.01)

(58) Field of Classification Search
CPC ............ A61B 1/00117; A61B 1/00121; A61B 1/00188; A61B 1/00197; A61B 1/042; A61B 1/00177; A61B 1/00179; A61B 1/00195; A61B 17/3478; A61B 17/3496

USPC .................................................. 600/137, 138
See application file for complete search history.

(56) References Cited

U.S. PATENT DOCUMENTS

| | | | |
|---|---|---|---|
| 3,941,121 A | 3/1976 | Olinger | |
| 4,969,450 A | 11/1990 | Chinnock | |
| 5,359,992 A * | 11/1994 | Hori | A61B 1/042 403/DIG. 1 |
| 5,836,867 A | 11/1998 | Speier et al. | |
| 6,522,477 B2 | 2/2003 | Anhalt | |
| 6,633,438 B2 | 10/2003 | Anhalt | |
| 6,743,168 B2 | 6/2004 | Luloh | |
| 7,511,905 B2 | 3/2009 | Matsuki | |
| 8,840,543 B2 | 9/2014 | Deng et al. | |

(Continued)

OTHER PUBLICATIONS

International Preliminary Report on Patentability dated Jun. 13, 2023, directed to International Application No. PCT/US2021/064622; 9 pages.

(Continued)

*Primary Examiner* — Aaron B Fairchild
(74) *Attorney, Agent, or Firm* — Morrison & Foerster LLP

(57) ABSTRACT

An endoscope includes a connection portion for connecting the endoscope to a camera head; a needle assembly; a sleeve that is fixed relative to the needle assembly; a focusing optic assembly housed within the sleeve and comprising at least one optical component, the focusing optic assembly being translatable relative to the sleeve for adjusting a focus of the endoscope; and a user-engageable rotator operably coupled to the needle assembly and the sleeve to rotate the needle assembly and sleeve relative to the connection portion to adjust a view direction of the needle assembly.

17 Claims, 12 Drawing Sheets

(56) References Cited

U.S. PATENT DOCUMENTS

2003/0103279 A1    6/2003  Anhalt
2006/0229495 A1*  10/2006  Frith ................. A61B 1/00128
                                                    600/112
2015/0112133 A1*   4/2015  Mattes ................ A61B 1/042
                                                    600/109

OTHER PUBLICATIONS

International Search Report and Written Opinion mailed May 20, 2022, directed to International Application No. PCT/US2021/064622; 16 pages.
Invitation to Pay Additional Fees, and Where Applicable, Protest Fee mailed Mar. 29, 2022, directed to International Application No. PCT/US2021/064622; 11 pages.

* cited by examiner

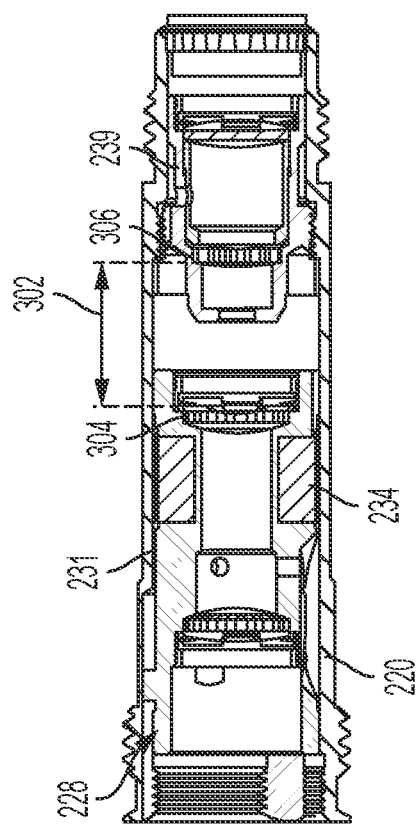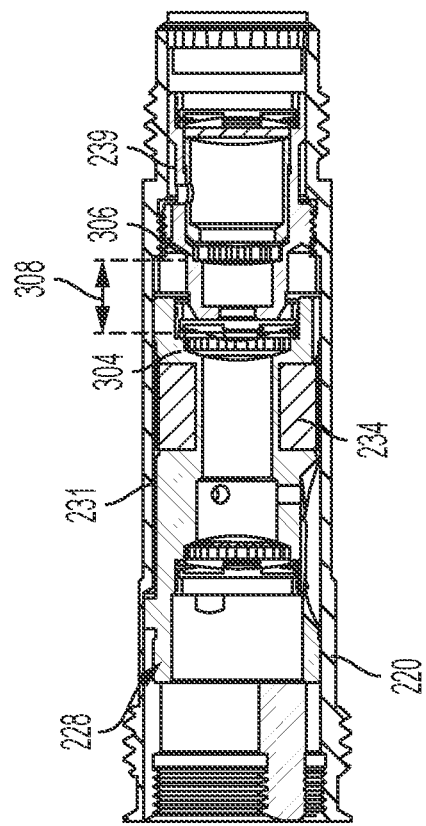

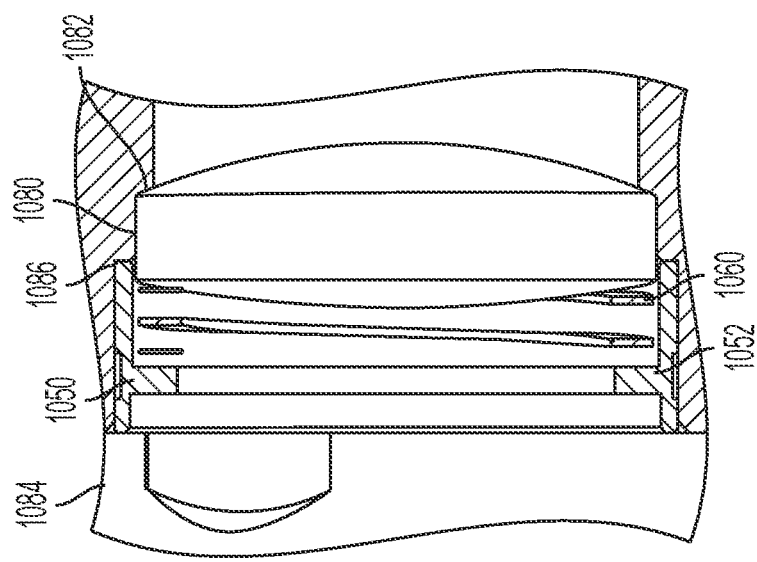
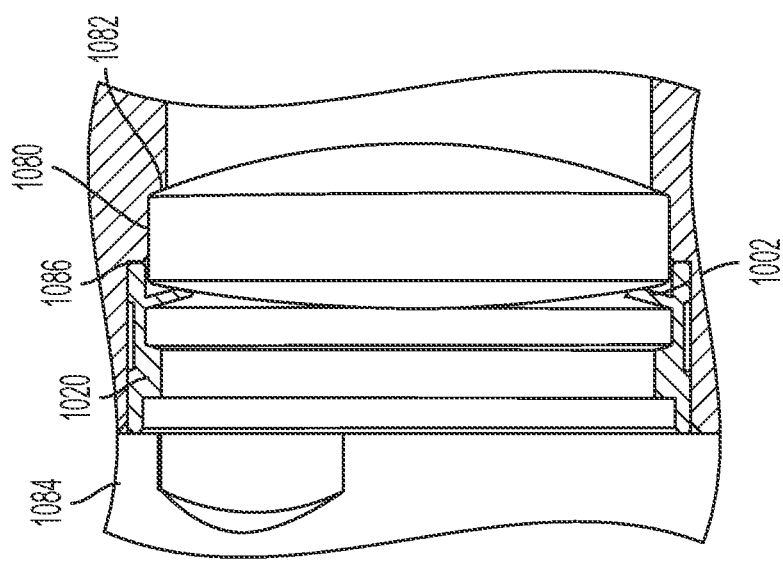

AUTOCLAVABLE ENDOSCOPE FOR ENDOSCOPIC IMAGING SYSTEMS

CROSS-REFERENCE TO RELATED APPLICATIONS

This application claims the benefit of U.S. Provisional Application No. 63/130,344, filed Dec. 23, 2020, the entire contents of which are hereby incorporated by reference herein.

FIELD

The present invention pertains to the field of medical devices. More particularly, the present invention relates to endoscopic camera systems.

BACKGROUND

An endoscopic camera system includes an endoscope that can be inserted into the body of a subject for delivering light to and receiving light from a surgical cavity. The endoscope is mounted to a camera head that can capture video and images based on the light received from the endoscope. The camera head is communicatively coupled to a camera control unit that processes video and image data from the camera head for display or storage.

An optical coupler is generally used to connect the endoscope to the camera head and can include optical components for focusing the light received from the endoscope onto the imaging sensor assembly in the camera head. To provide this focusing function, a coupler may include one or more optical components, such as one or more lenses or prisms, that can be moved relative to the camera, the endoscope, or both, to alter the focal distance.

Because the coupler is used in the medical operating environment, sterilization is necessary between uses. Steam autoclaving is a common method of sterilization and is used for many medical instruments that can withstand the necessary high temperature and pressure. Optical systems can be very sensitive to condensation caused by moisture, particularly the moisture of a sterilizing environment. Moisture from sterilization that penetrates into the interior of the optical chamber can cause fogging (condensation) on lenses and other optical components, which can reduce the quality of images generated by the camera head. Therefore, couplers must be sealed against the moisture of a sterilizing environment while still enabling movement of focusing optics.

SUMMARY

According to an aspect, a coupler of an endoscope includes a focusing optical assembly that is provided in a sealed housing and can be moved for focusing via magnetic coupling with a magnetic assembly located externally to the sealed housing. A user can rotate a focus ring to move the magnetic assembly, which in turn moves the focusing optical assembly provided in the sealed housing. In some examples, the focusing optical assembly translates and does not rotate during focusing, which eliminates potential optical runout issues. In some examples, the sealed housing is affixed to the needle of the endoscope. The arrangement of the sealed housing, focusing optical assembly, and external magnetic assembly enable the needle to be rotated relative to the coupler without affecting the focus of the coupler.

According to an aspect, an endoscope includes a connection portion for connecting the endoscope to a camera head, a needle assembly, a sleeve that is fixed relative to the needle assembly, a focusing optic assembly housed within the sleeve and comprising at least one optical component, the focusing optic assembly being translatable relative to the sleeve for adjusting a focus of the endoscope, and a user-engageable rotator operably coupled to the needle assembly and the sleeve to rotate the needle assembly and sleeve relative to the connection portion to adjust a view direction of the needle assembly.

Optionally, the focusing optic assembly is rotationally coupled to the sleeve such that the focusing optic assembly rotates with the sleeve.

Optionally, the focusing optic assembly is free to rotate relative to the sleeve.

Optionally, the sleeve houses at least one fixed optical component that is translationally and rotationally fixed relative to the sleeve.

Optionally, the focusing optic assembly is magnetically coupled to a magnetic coupling assembly located externally to the sleeve such that translation of the magnetic coupling assembly translates the focusing optic assembly.

Optionally, the magnetic coupling assembly includes at least one magnet that rotates and translates with the focusing optic assembly. The magnetic coupling assembly may include a translatable component that is rotationally fixed relative to the connection portion and the at least one magnet is rotatable relative to and translatable with the translatable component. The connection portion may include a main body that comprises at least one slot for receiving at least one projection of the translatable component of the magnetic coupling assembly.

Optionally, the magnetic coupling assembly comprises at least one magnet that is rotationally fixed relative to the connection portion.

Optionally, the endoscope includes a focus ring that engages the magnetic coupling assembly such that rotation of the focus ring causes translation of the magnetic coupling assembly. The focus ring and the magnetic coupling assembly may engage via a helical engagement.

Optionally, the focusing optic assembly comprises at least one magnet.

Optionally, the sleeve is preloaded in an axial direction.

Optionally, the endoscope includes a focus ring that is user-rotatable for adjusting an axial location of the focusing optic assembly within the sleeve, wherein the focus ring remains rotationally fixed relative to the connection portion while the user-engageable rotator is rotated.

Optionally, the sleeve is hermetically sealed to the needle assembly.

Optionally, the endoscope is autoclavable.

Optionally, the focusing optic assembly comprises a plurality of optical components.

Optionally, the needle assembly comprises a light cable connector and rotation of the user-engageable rotator adjusts a position of the light cable connector relative to the connection portion.

Optionally, the needle assembly comprises an angled distal end and rotation of the user-engageable rotator adjusts a view angle of the endoscope.

According to an aspect, a method of adjusting a rotational position of a needle assembly of an endoscope includes rotating a user-engageable rotator of a coupler operably coupled to the needle assembly to rotate the needle assembly relative to the coupler, wherein the user-engageable rotator is operably coupled to a sleeve of the coupler such that the sleeve rotates along with the needle assembly, wherein the sleeve houses a focusing optic assembly that is axially translatable relative to the sleeve for adjusting a focus of the endoscope and the focusing optic assembly remains axially stationary during rotation of the user-engageable rotator.

Optionally, the method includes rotating a focus ring that is operably coupled to the focusing optic assembly to axially translate the focusing optic assembly. The focus ring may remain in place as the user-engageable rotator is rotated. The user-engageable rotator may remain in place as the focus ring is rotated.

Optionally, rotating the user-engageable rotator adjusts a view direction of the needle assembly.

Optionally, rotating the user-engageable rotator adjusts a position of a light cable connector of the needle assembly.

Optionally, the focusing optic assembly rotates with the sleeve.

Optionally, the sleeve rotates relative to the focusing optic assembly.

Optionally, the method includes rotating the user-engageable rotator while imaging using an endoscopic imager that comprises the endoscope.

According to an aspect, a coupler for coupling an endoscope to a camera head includes a connection portion for connecting the coupler to a camera head; a sleeve; a focusing optic assembly housed within the sleeve and comprising at least one optical component, the focusing optic assembly being translatable relative to the sleeve for adjusting a focus of the endoscope; and a magnetic coupling assembly located externally to the sleeve and magnetically coupled to the focusing optic assembly, wherein the magnetic coupling assembly is translatable relative to the connection portion and at least a portion of the magnetic coupling assembly is rotationally fixed relative to the connection portion; and a user-rotatable focus ring for adjusting a focus of the coupler, wherein rotation of the user-rotatable focus ring causes translation of the magnetic coupling assembly.

Optionally, the focusing optic assembly is rotationally coupled to the sleeve such that the focusing optic assembly rotates with the sleeve.

Optionally, the focusing optic assembly is free to rotate relative to the sleeve.

Optionally, the sleeve houses at least one fixed optical component that is translationally and rotationally fixed relative to the sleeve.

Optionally, the magnetic coupling assembly comprises at least one magnet that rotates and translates with the focusing optic assembly. The magnetic coupling assembly may include a translatable component that is rotationally fixed relative to the connection portion and the at least one magnet may be rotatable relative to and translatable with the translatable component. The connection portion may include a main body that comprises at least one slot for receiving at least one projection of the translatable component of the magnetic coupling assembly.

Optionally, the magnetic coupling assembly includes at least one magnet that is rotationally fixed relative to the connection portion.

Optionally, the focus ring and the magnetic coupling assembly engage via a helical engagement.

Optionally, the focusing optic assembly comprises at least one magnet.

Optionally, the sleeve is preloaded in an axial direction.

Optionally, the coupler includes a user-engageable rotator for rotating a needle assembly attached to the coupler.

Optionally, the focus ring can rotate independently of the user-engageable rotator.

According to an aspect, a method for adjusting a focus of an endoscope coupler includes rotating a focus ring of the coupler, wherein rotation of the focus ring causes translation but not rotation of a magnetic coupling assembly located externally to a sleeve that houses a focusing optic assembly, wherein the magnetic coupling assembly magnetically couples with the focusing optic assembly through the sleeve such that translation of the magnetic coupling assembly causes translation of the focusing optic assembly which adjusts the focus of the coupler. It is noted that the method concerns the operating of the endoscope. There is no functional link between the method and effects produced by the endoscope on the body. The endoscope can be pre-inserted into the body. The method can exclude the step of inserting the endoscope into the body. The method is not a method of treatment of the body.

Optionally, the magnetic coupling assembly includes a rotatable portion that supports at least one magnet and can rotate with the focusing optic assembly relative to the sleeve.

Optionally, the magnetic coupling assembly includes at least one magnet that is rotationally fixed.

Optionally, the method includes rotating a user-engageable rotator of the coupler to rotate a needle assembly connected to the coupler, wherein the sleeve rotates with rotation of the user-engageable rotator. The focusing optic assembly may rotate with the sleeve. The focusing optic assembly may remain rotationally stationary as the sleeve rotates.

Optionally, the method includes adjusting the focus while imaging using an endoscope coupled to an endoscopic imager via the coupler.

According to an aspect, an endoscopic camera includes a camera head connected to the connection portion of any of the above endoscopes or to the connection portion of any of the above couplers.

It will be appreciated that any of the variations, aspects, features and options described in view of the systems apply equally to the methods, endoscopes, couplers and cameras and vice versa. It will also be clear that any one or more of the above variations, aspects, features and options can be combined.

BRIEF DESCRIPTION OF THE FIGURES

The invention will now be described, by way of example only, with reference to the accompanying drawings, in which:

FIG. 3A and FIG. 3B illustrate two different focus positions of an exemplary focusing assembly;

FIG. 10A and FIG. 10B illustrate exemplary retainers that can be used for retaining one or more optical components.

DETAILED DESCRIPTION

Figure 1:
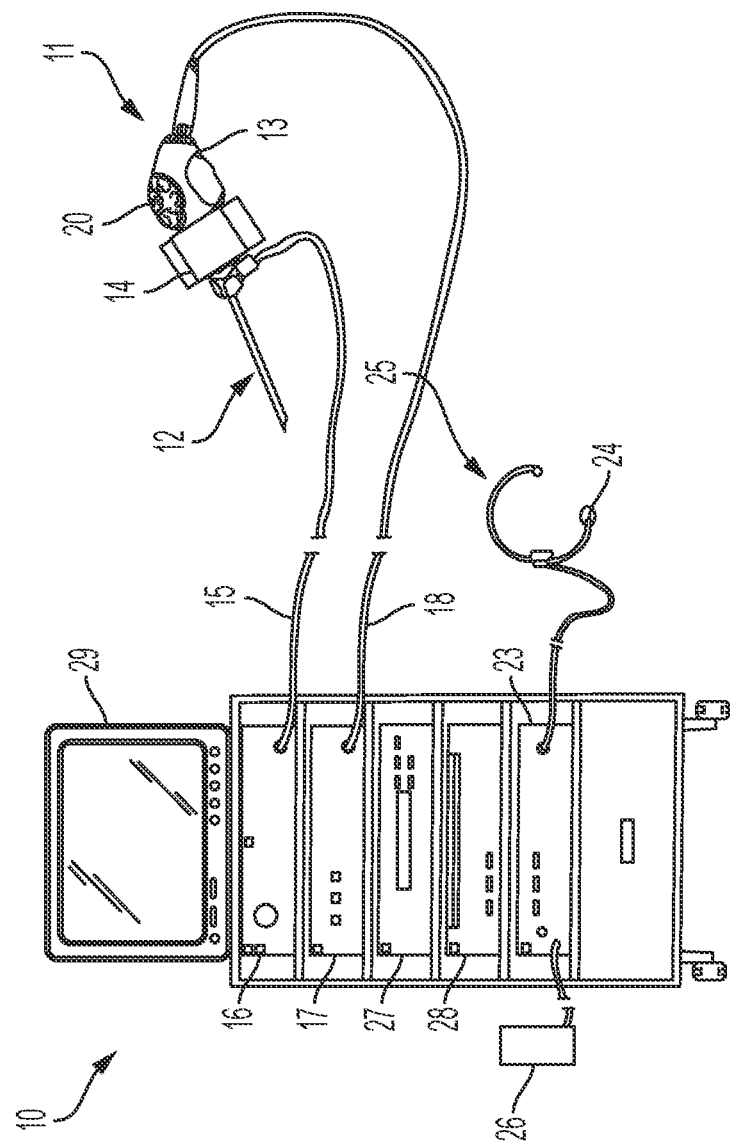
FIG. 1 illustrates an exemplary endoscopic imaging system.

Reference will now be made in detail to implementations and examples of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In some examples, systems and methods for endoscopic imaging include an endoscope that has a focusing optical assembly that is housed within a sealed sleeve that enables the endoscope to be sterilized without risking exposing the focusing optics to moisture. In some examples, the sealed sleeve is hermetically sealed, which can enable the endoscope to be autoclaved. The focusing assembly within the sealed sleeve is translatable along the longitudinal axis of the endoscope to provide focus adjustment. The focusing assembly is translated via magnetic coupling with a magnetic assembly located externally to the sealed sleeve. The magnetic assembly can be configured to transfer rotational movement of a user-engagable focus adjustment ring into translation of the magnetic assembly, which in turn translates the focusing assembly within the sealed sleeve via magnetic coupling. Focusing can be adjusted without rotational movement of the focusing optics, which eliminates optical runout concerns.

The coupling portion can be configured to enable rotation of the needle relative to the coupling portion (and an attached camera head) for adjusting a viewing angle of the needle and/or adjusting the position of a light cable port relative to the camera head. In some examples, the sleeve may rotate with the needle due to being sealed to the needle of the endoscope such that moisture is prevented from being introduced into the interior of the needle or sleeve. In some examples, the focus assembly is keyed to the sleeve and rotates with the sleeve, and the external magnetic assembly includes a rotatable magnetic carrier that enables rotation of the focus assembly without affecting the longitudinal position of the focus assembly (and, thus, the focus). In some examples, the focus assembly is not keyed to the sleeve.

The magnet assembly that is external to the sealed sleeve can include a yoke that is rotationally keyed to the main body of the coupling portion. The yoke can have a helical engagement with the user-engageable focus ring such that rotation of the focus ring causes translation of the yoke due to the yoke's rotational constraint by the main body. The yoke may support magnetic components that couple with the focusing assembly sealed within the sleeve such that translation of the yoke causes translation of the focusing assembly. In some examples, the magnets are included in a magnet carrier that is rotatable relative to the yoke such that the focusing assembly can rotate along with the sleeve. In other examples, the magnets are fixed relative to the yoke such that the focusing assembly within the sleeve is rotationally constrained by its magnetic coupling with the magnets of the yoke. In some examples, to permit the sleeve to rotate along with the needle, the focusing assembly is rotatable relative to the sleeve.

In the following description of the various examples, reference is made to the accompanying drawings, in which are shown, by way of illustration, specific examples that can be practiced. It is to be understood that other examples and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain terminology is used in this description for convenience and reference only, and is not limiting. For example, the words "upwardly," "downwardly," "rightwardly," and "leftwardly" refer to directions in the drawings to which reference is made. The words "inwardly" and "outwardly" refer to directions toward and away from, respectively, the geometric center of the arrangement and designated parts thereof. The words "forwardly" and "distally" refer to the direction toward the end of the arrangement that is closest to the patient, and the words "rearwardly" and "proximally" refer to the direction toward the end of the arrangement which is furthest from the patient. This terminology includes the words specifically mentioned, derivatives thereof, and words of a similar nature.

FIG. 1 illustrates an exemplary endoscopic imaging system 10. Endoscopic imaging system 10 includes an endoscope assembly 11 that can be used for visualizing inside of a subject's body during an endoscopic procedure. The endoscope assembly 11 includes an endoscope 12 coupled to a camera head 13 by a coupling portion 14 that forms the proximal portion of the endoscope 12. Light is provided to the endoscope 12 by a light source 16 via a light cable 15, which can be, for example, a fiber optic cable. The endoscope 12 directs the light from the light cable 15 to the area of interest within the subject's body, receives light reflected from the area of interest, and conveys light to an imager within the camera head 13. The endoscope can be inserted into a natural or pre-made body cavity. The endoscope can be pre-inserted. The imager is comprised of one or more image sensors that convert the optical image into electrical signals.

The camera head 13 may be coupled to a camera control unit (CCU) 17 by a camera cable 18. The camera cable 18 can convey imaging data from the camera head 13 to the CCU 17 for display on display 29. In some examples, various control signals are transmitted bi-directionally between the camera head 13 and the CCU 17 via the camera cable 18.

A user interface 20 can be provided on the camera head 13 for enabling a user to manually control various functions of the endoscopic imaging system 10. According to some examples, various functions of the endoscopic imaging system 10 may be controlled by voice commands received by a microphone 24 mounted on a headset 25 worn by the surgeon and coupled to the voice-control unit 23, which can be coupled to the CCU 17. A hand-held control device 26, such as a tablet with a touch screen user interface, may be coupled to the voice-control unit 23 as a further control interface. In some examples, an imaging system controller 27 can be included and connected to one or more system components, such as the CCU 17 and/or the light source 16. In some examples, the imaging system controller 27 provides further processing of image data from the CCU 17, controls display and storage of image data and communication of imaging or other data to a hospital network, and/or communicates control commands to connected system components. In some examples, a printer 28 may be included for printing hard copies of one or more images.

Figure 2A:
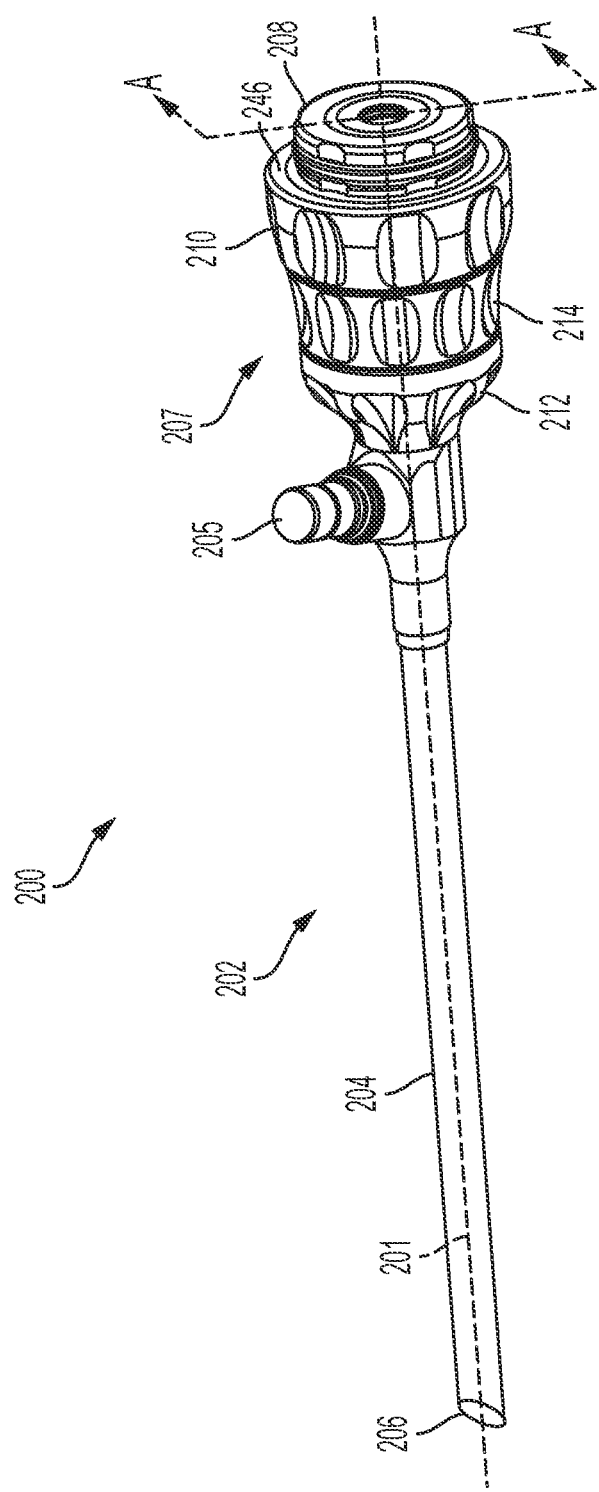
FIG. 2A illustrates an exemplary endoscope that can be connected to an endoscopic camera head.

FIG. 2A illustrates an exemplary endoscope 200 that can be connected to an endoscopic camera head, such as camera head 13 of FIG. 1. Endoscope 200 includes a needle assembly 202 that comprises a needle 204 for insertion into a surgical cavity and a port 205 for connecting a light cable to the endoscope. As is known in the art, the needle 204 emits light received from a connected light cable from the distal end 206 of the needle 204 to illuminate the scene. Light from the scene is received at the distal end 206, such as through a window or other optical component located at the distal end 206. The distal end 206 can be angled relative to a longitudinal axis of the needle 204, such as in the example shown in FIG. 2A, or can be perpendicular to the longitudinal axis 201 of the needle 204.

The needle assembly 202 is connected to a coupling portion 207 that couples the endoscope 200 to a camera head and houses one or more optical components (e.g., one or more lenses, prisms, filters, window, etc.) for focusing light received from the scene onto a coupled camera head. The coupling portion 207 includes a connection portion 208 for connecting the coupling portion 207 to a camera head. The connection portion 208 can include, for example, a C-mount style connector or a bayonet style connector. The connection portion 208 can include a main body 246 that includes a graspable ring 210 for rotating the coupling portion 207 when mounting the endoscope 200 to the camera head.

The coupling portion 207 can include a needle assembly rotating ring 212 that is rotationally mounted such that it can rotate relative to the connection portion 208. The needle assembly 202 is mounted to the coupling portion 207 such that rotation of the needle assembly rotating ring 212 rotates the needle assembly 202. A user can grasp and rotate the needle assembly rotating ring 212 to rotate the needle assembly 202 while the endoscope 200 is coupled to the camera head during use, such as to change the viewing direction when the needle 204 includes an angled distal end 206 and/or to adjust a position of the port 205 and attached light cable (e.g., light cable 15 of FIG. 1).

The coupling portion 207 can include a focus ring 214 located between the ring 210 and the needle assembly rotating ring 212 and that is rotatable relative to both. As described in detail below, rotation of the focus ring 214 adjusts the axial position of one or more optical components within the coupling portion 207 to adjust a focus of the endoscope 200 such that focus of the endoscope 200 can be adjusted while imaging with the endoscope 200 coupled to an endoscopic camera head. Also as described below, the focus ring 214 can be rotated independently of the needle assembly rotating ring 212 and needle assembly rotating ring 212 can be rotated independently of the focus ring 214.

Figure 2B:
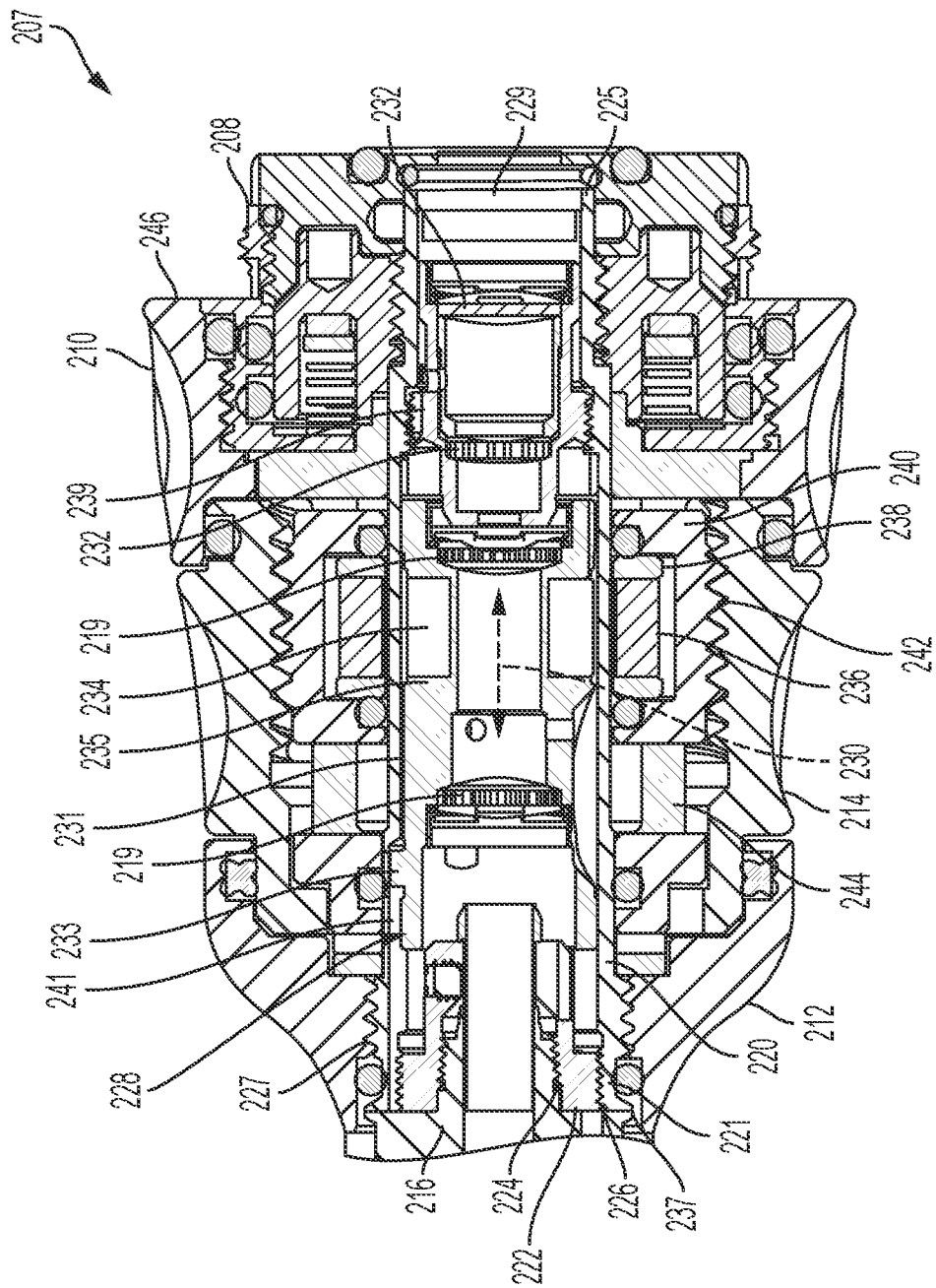
FIG. 2B is a cross section of an example of a coupling portion of the endoscope of FIG. 2A through line A-A of FIG. 2A.

FIG. 2B is a cross section of the coupling portion 207 of endoscope 200 through line A-A of FIG. 2A. The proximal end 216 of the needle assembly 202 is received in the proximal end 218 of the coupling portion 207. The proximal end 216 of the needle assembly 202 may be coupled to a sleeve 220 that provides a sealed housing for optical components of the coupling portion 207. In the illustrated example, a connector 222 is threaded onto the proximal end 216 of the needle assembly 202 via threaded engagement 224 and the connector 222 is threaded into the distal end 221 of the sleeve 220 via threaded engagement 226. The needle assembly 202 may be sealed to the sleeve 220 to prevent moisture from entering the needle assembly 202 and sleeve 220. In some examples, the needle assembly 202 is hermetically sealed to the sleeve 220, such as via a welded joint at the interface 237 between the proximal end 216 of needle assembly 202 and the sleeve 220. In some examples, the sleeve 220 is sealed without using any dynamic seals (e.g., without using any O-rings).

The proximal end 225 of the sleeve 220 includes a window 229 or other optical component that is sealingly mounted to the sleeve 220, such as via brazing or adhesive. The window 229 can be hermetically sealed to the sleeve 220. In some examples, the sealing of the distal end 221 of the sleeve 220 to the needle assembly 202 and the proximal end 225 of the sleeve 220 to the window 229 ensures that moisture cannot enter the sleeve 220 and cloud the optical components therein. In some examples, the sleeve 220 is hermetically sealed to withstand a high temperature, pressure, and moisture environment so that the endoscope 200 can be sterilized via autoclaving.

The needle assembly rotating ring 212 can be coupled to the sleeve 220 via threaded engagement 227 such that rotation of needle assembly rotating ring 212 rotates the sleeve 220 and the needle assembly 202 together.

As shown in FIGS. 2B and 3A-B, sleeve 220 houses a focusing assembly 228 that can slide within the sleeve 220 in the longitudinal direction 230. The focusing assembly 228 includes one or more optical components 219 mounted to a cylinder 231. The sleeve 220 houses one or more fixed optical components 232 that are rotationally and translationally fixed relative to the sleeve 220. The one or more fixed optical components 232 can be directly mounted to the sleeve 220 or can be mounted to one or more mounting components 239 that are mounted to the sleeve 220. Translation of the focusing assembly 228 relative to the one or more fixed optical components 232 changes the focus of the endoscope 200 according to well-known principles in optical design.

FIG. 3A and FIG. 3B illustrate two different focus positions of the focusing assembly 228 within the sleeve 220. In FIG. 3A, the focusing assembly 228 is in a first focus position within the sleeve 220 with a first spacing 302 between a proximal lens 304 of the focusing assembly 228 and a distal lens 306 of the fixed optical components. In FIG. 3B, the focusing assembly 228 has translated in a proximal direction within the sleeve 220 to a second focus position that has a second spacing 308 between the proximal lens 304 of the focusing assembly 228 and the distal lens 306 of the fixed optical components 232 that is less than the first spacing 302.

Returning to FIG. 2B, the focusing assembly 228 is keyed to the sleeve 220 such that the focusing assembly 228 is rotatably fixed relative to the sleeve 220, according to some examples. With the focusing assembly 228 keyed to the sleeve 220, the one or more optical components 219 of the focusing assembly 228 are in a rotationally fixed relationship with the one or more fixed optical components 232, which can eliminate optical runout during focusing since the focusing assembly 228 does not rotate relative to the fixed optical components during focusing.

Figure 4:
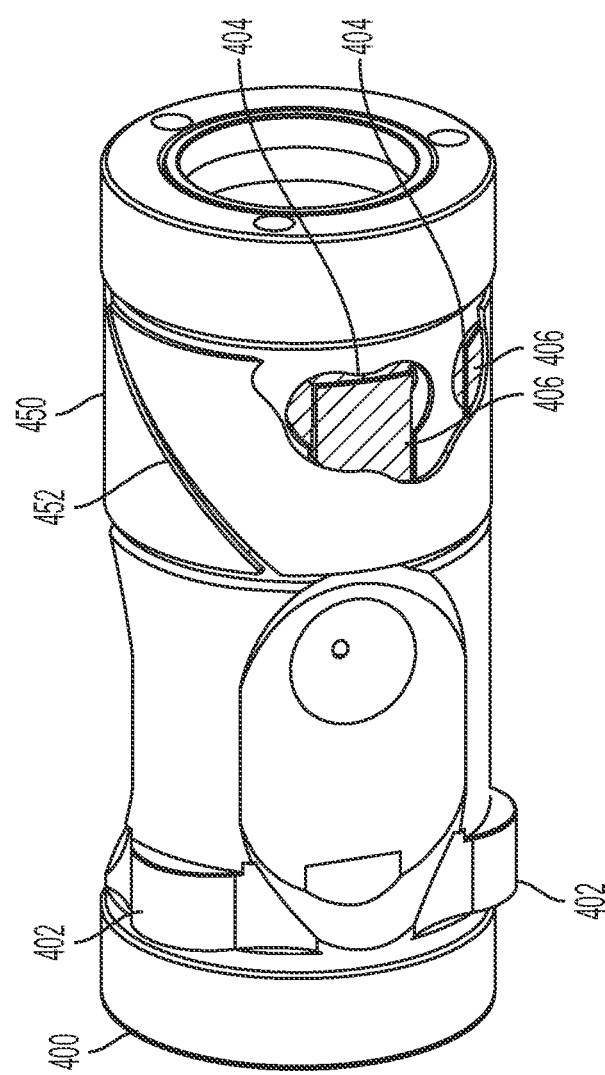
FIG. 4 illustrates a perspective view of an exemplary cylinder of a focusing assembly.

In some examples, the cylinder 231 of the focusing assembly 228 keys to the sleeve 220 via one or more tabs 233 that project outwardly from the cylinder 231 and ride within corresponding inwardly facing grooves 241 of the sleeve 220. FIG. 4 illustrates a perspective view of an exemplary cylinder 400 that can be used for the cylinder 231. Cylinder 400 includes a plurality of circumferentially spaced tabs 402 that can ride in corresponding grooves of the sleeve.

In some examples, due to the keying of the focusing assembly 228 to the sleeve 220, when the user rotates the needle assembly rotating ring 212 to rotate the needle assembly 202, the focusing assembly 228 rotates with rotation of the sleeve 220 (which is rotationally fixed to the needle assembly 202). However, during such rotation, the focusing assembly does not translate in the longitudinal direction due to magnetic coupling with an external magnet carrier, as discussed further below.

The focusing assembly 228 includes one or more magnetic components 234 that can be positioned within one or more pockets 235 of the cylinder 231. In the example of FIG. 4, magnetic components 404 are positioned in pockets 406 of the cylinder 400. In some examples, the magnetic components 404 can be retained via a spring sleeve 450, which has a split 452 that allows the spring sleeve 450 to be enlarged in diameter to slide over and press against the magnetic components 404.

Returning to FIG. 2B, the magnetic components 234 magnetically couple to one or more magnetic components 236 of a magnet carrier 238 that is mounted radially outwardly of the sleeve 220. The magnet carrier 238 is housed within a yoke 240. The yoke 240 is engaged with the focus ring 214 such that rotation of the focus ring 214 causes translation of the yoke 240. For example, the yoke 240 can have a threaded engagement 242 with the focus ring 214. Any other suitable engagement can be used that can transform the rotation of the focus ring 214 to translation of the yoke 240, including, for example, one or more pins fixed to the focus ring 214 or yoke 240 riding in one or more helical slots in the other of the focus ring 214 or yoke 240. The yoke 240 and magnet carrier 238 can slide along the external surface of the sleeve 220.

The yoke 240 engages longitudinally extending slots 244 of a main body 246 that prevent the yoke 240 from rotating. The main body 246 is fixedly coupled to the connection portion 208 and, thereby, fixed in place relative to a camera head to which the endoscope 200 is connected. With the yoke 240 rotationally fixed by the main body 246, rotation of the focus ring 214 causes the yoke 240 to translate along the slots 244. The yoke 240 carries the magnet carrier 238 with it, and the magnetic coupling of the one or more magnetic components 236 of the magnet carrier 238 with the one or more magnetic components 234 of the focusing assembly 228 causes the focusing assembly 228 to translate within the sleeve 220 in coordination with the translation of the yoke 240 and magnet carrier 238. Thus, rotation of the focus ring 214 causes translation but not rotation of focusing assembly 228 without direct connection such that focusing assembly 228 can be sealed (for example, hermetically sealed) within the sleeve 220.

Figure 5C:
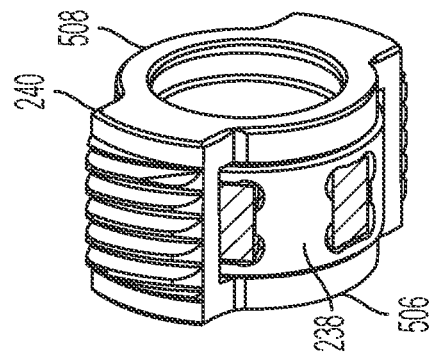
FIGS. 5A, 5B, and 5C are perspective views of various aspects of an exemplary yoke and magnet carrier.
Figure 5B:
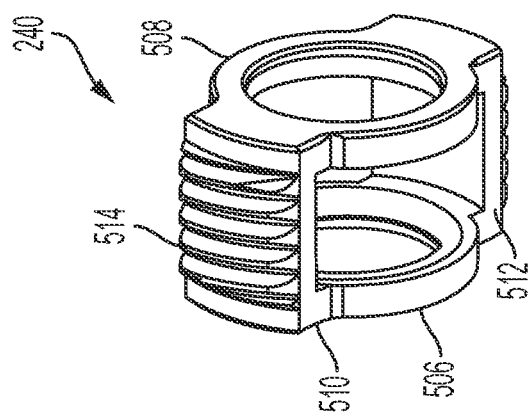
Figure 5A:
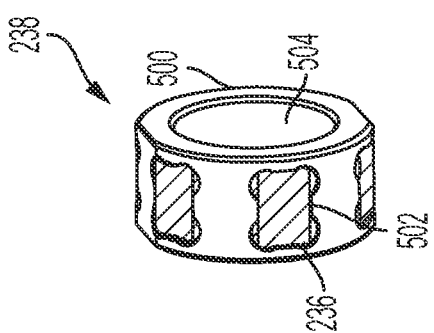
Figure 6:
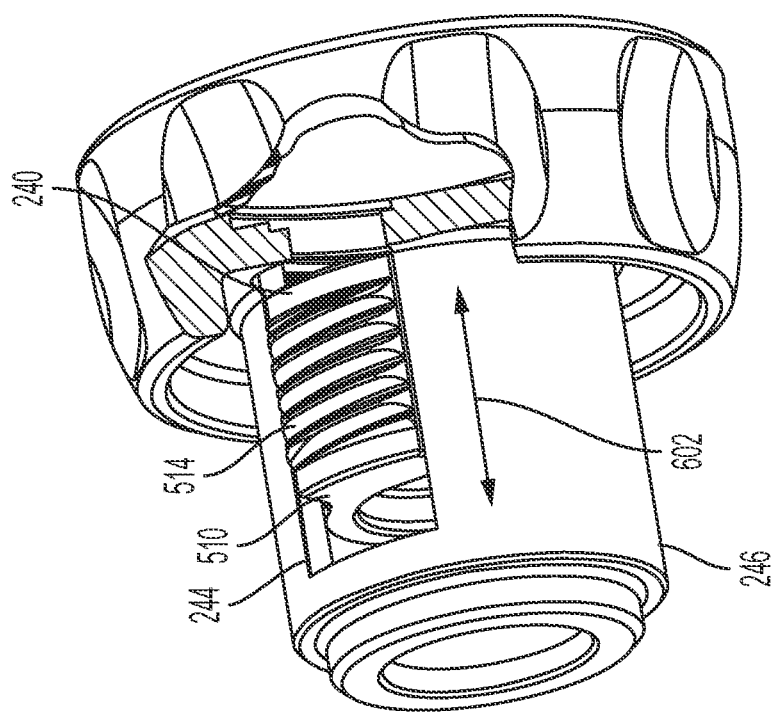
FIG. 6 is a partial cutaway perspective view of an exemplary yoke assembled to a main body.

FIGS. 5A, 5B, and 5C are perspective views of examples of the yoke 240, magnet carrier 238, and the yoke 240 and magnet carrier 238 assembled together, respectively. The magnet carrier 238 includes a cylindrical body 500 and a plurality of magnetic components 236 positioned in pockets 502 of the cylindrical body 500. The magnetic components 236 can be retained in the pockets 502 in any suitable manner, including via a spring sleeve such as spring sleeve 450 of FIG. 4. The cylindrical body 500 has a central passageway 504 so that the cylindrical body 500 can slide over the external surface of the sleeve 220. As shown in FIG. 5B, the yoke 240 can include front and rear rings 506, 508 that are configured for sliding over the external surface of the sleeve 220. The magnet carrier 238 is positioned between the front and rear rings 506, 508, which constrains the magnet carrier 238 in the longitudinal direction. The magnet carrier 238 is free to rotate relative to yoke 240. Upper and lower projections 510, 512 of the yoke 240 extend between the front and rear rings 506, 508 and may include partial threads 514 for engaging internal threads of the focus ring 214. The upper and lower projections 510, 512 can fit into the respective slots 244 of the main body 246 as shown best in FIG. 6, which is a partial cutaway perspective view of the yoke 240 assembled to the main body 246. The upper projection 510 is received in the longitudinally extending slot 244 of the main body 246, which rotationally constrains the yoke 240 while permitting the yoke 240 to slide in the longitudinal direction 602.

As noted above, the sleeve 220 can be rotationally fixed to the needle assembly 202 such that rotation of the needle assembly 202 (e.g., to adjust the viewing angle of the distal end of the needle) results in rotation of the sleeve 220. Due to the keying of the focusing assembly 228 to the sleeve 220, the focusing assembly 228 rotates along with rotation of the sleeve 220. The magnet carrier 238 is rotationally coupled to the focusing assembly 228 via the magnetic coupling between the magnetic components 236 of the magnet carrier 238 and the magnetic components 234 of focusing assembly 228 and, therefore, rotates along with the focusing assembly 228. To permit the magnet carrier 238 to rotate along with the focusing assembly 228, the magnet carrier 238 is free to rotate within the yoke 240. Thus, during rotation of the needle assembly 202, such as via user rotation of the needle assembly rotating ring 212, the sleeve 220 rotates, the focusing assembly 228 rotates with the sleeve 220 due to its keyed engagement with the sleeve 220, and the magnet carrier 238 rotates with the focusing assembly 228 and sleeve 220 due to its magnetic coupling with the focusing assembly 228. The magnet carrier 238 is free to rotate relative to the yoke 240, which cannot rotate due to its engagement with the main body 246. During rotation of these components, the magnet carrier 238 remains translationally fixed due to the yoke 240 being translationally fixed by its engagement with the focus ring 214. The focusing assembly 228 remains translationally fixed due to its magnetic coupling with the translationally fixed magnet carrier 238, and therefore, the focus of the endoscope 200 does not change during rotation of the needle assembly 202.

Figure 7A:
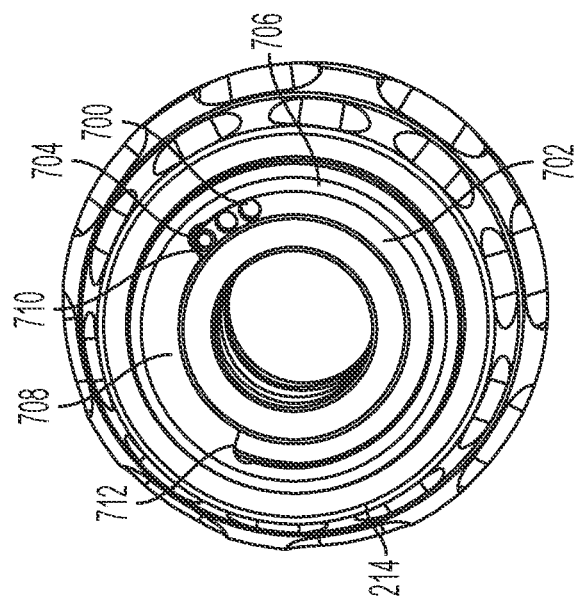
FIG. 7A is a perspective view of an example of a main body of a coupling portion with a yoke mounted therein.
Figure 7B:
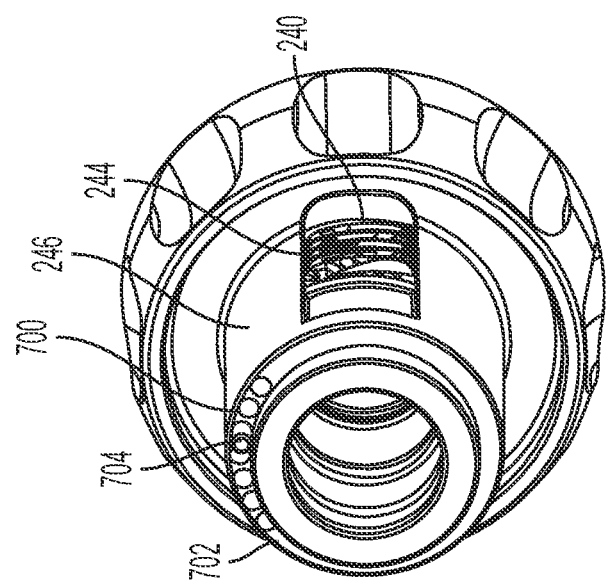
FIG. 7B illustrates an example of a focus ring mounted on the main body.

FIGS. 7A and 7B illustrate an example of a travel limiting mechanism that limits the rotational limits of the focus ring 214 and, thereby, the translational limits of the focusing assembly 228 within the sleeve 220. FIG. 7A is a perspective view of the main body 246 of the coupling portion 207 with the yoke 240 mounted in the slot 244 of the main body 246 and FIG. 7B includes the focus ring 214 mounted on the main body 246. As shown in FIG. 7A, the main body 246 can include one or more holes 700 located in a distal end surface 702. A pin 704 can be placed in one of the holes 700 to serve as a stop for the focus ring 214, while also preventing locking or binding of the threaded engagement between the focus ring 214 and the yoke 240. The focus ring 214 can include a distal end flange 706 that extends radially inwardly and includes a partial wall 708 that extends further radially inwardly than the rest of the flange 706. Abutment between the ends 710, 712 of the partial wall 708 with the pin 704 provides the travel limits for the focus ring 214. FIG. 7B illustrates the focus ring 214 at its first travel limit in which end 710 of the partial wall 708 abuts the pin 704. The focus ring 214 can be rotated counterclockwise with respect to the viewpoint shown in FIG. 7B until the opposite end 712 of the partial wall 708 abuts the pin 704, which is the second travel limit. The circumferential extent of the partial wall controls the total amount of rotation of the focus ring 214, with the illustrated example providing about 240° of rotation (in some examples, the travel is at least 180°, at least 225°, at least 240°, at least 270°, at least 290°, or at least 315°). The placement of the pin 704 in the one or more holes 700 controls the start and end positions of the focus ring 214, so that the choice of placement allows for matching to the thread timing of the focus ring which can vary as a result of manufacture of the focus ring. As explained above, rotation of the focus ring 214 causes translation of the focusing assembly 228 within the sleeve 220 with the increment of translation of the focusing assembly per degree of rotation of the focus ring depending upon the pitch of the threaded engagement (or other type of rotational-translational engagement) between the focus ring 214 and the yoke 240. Therefore, the start and end positions of the focusing assembly 228 (the range of focus) can be controlled via the location of the pin 704 in the holes 700, the circumferential extent of the partial wall 708, and the pitch of the threaded engagement between the focus ring 214 and the yoke 240.

In some examples, during assembly of the endoscope 200, the focus ring 214 can be threaded onto the yoke 240 and rotated until the focus ring 214 can no longer turn due to some interference, such as due to the yoke 240 reaching an end of the slot 244 of the main body 246 or via engagement between the focusing assembly 228 and a feature within the sleeve 220. The focus ring 214 can then be rotated in the opposite direction to back away from this interference position until the pin 704 can be positioned in a hole 700 to provide the stop for rotation of the focus ring, and thereby serving as the travel limiter for focusing instead of the interference of the yoke 240 or focusing assembly 228 with their respective mating components.

In some examples, rotation of the focus ring 214 is not directly limited. Rather, the translational limits of the focusing assembly 228 can be controlled in other ways such as by controlling the available stroke of the yoke 240 within the slot 244 of the main body 246 or via engagement between the focusing assembly 228 and one or more features within the sleeve 220.

Figure 8A:
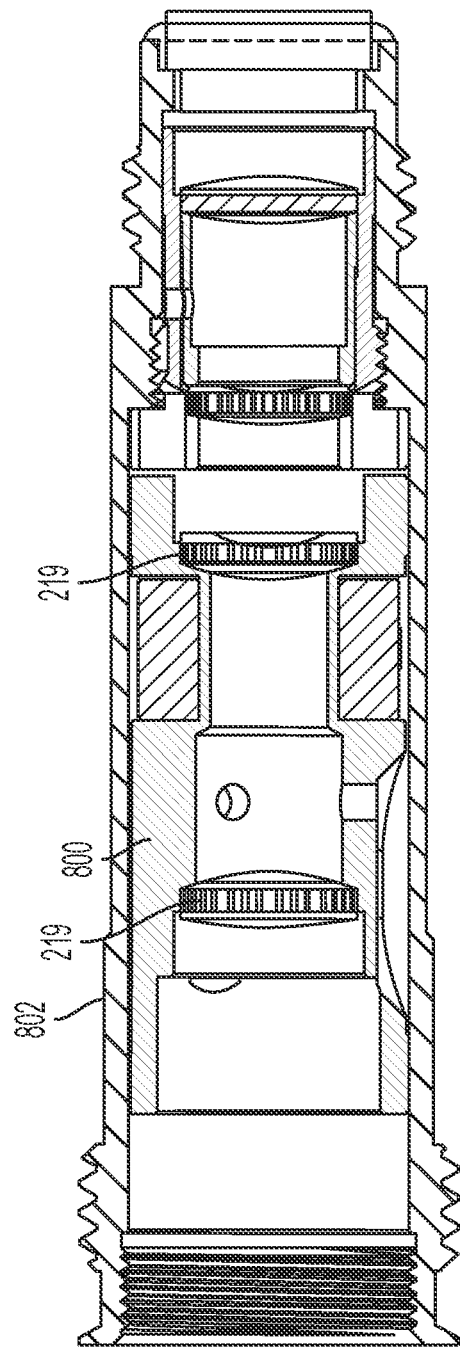
FIG. 8A and FIG. 8B illustrate an alternate arrangement of a focusing assembly, sleeve, and yoke.
Figure 8B:
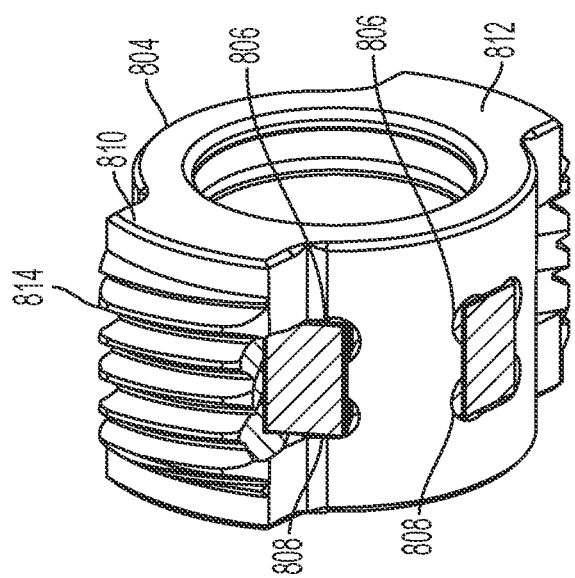

FIG. 8A and FIG. 8B illustrate an alternate arrangement of a focusing assembly, sleeve, and yoke, that can be used for the endoscope 200. FIG. 8A illustrates the focusing assembly 800 and sleeve 802, which are similar to the focusing assembly 228 and sleeve 220 of FIG. 2B. However, unlike the arrangement of FIG. 2B, the focusing assembly 800 of the arrangement of FIG. 8 is not keyed to the sleeve 802 and, therefore, is free to rotate relative to the sleeve 802 as well as translate. As illustrated in FIG. 8A, the focusing assembly 800 does not have the projections of the focusing assembly 228 of FIG. 2B and the sleeve 802 does not have the grooves of the sleeve 220 of FIG. 2B. In other respects, the sleeve 802 can be substantially similar to sleeve 220 and the focusing assembly 800 can be substantially similar to the focusing assembly 228.

The focusing assembly 800 is longitudinally translated within the sleeve via magnetic coupling with magnetic components located externally to the sleeve 802 in similar fashion to the arrangement of FIG. 2B. However, as shown in FIG. 8B, the magnetic components 808 are positioned directly in a yoke 804. The yoke 804 includes one or more pockets 806 for positioning the one or more magnetic components 808 such that the magnetic components 808 are fixed to the yoke 804, rather than being rotatable relative to the yoke as in the arrangement of FIG. 2B. The yoke 804 can be otherwise substantially similar to the yoke 240 of FIG. 2B and can engage the main body 246 and focus ring 214 in similar fashion to yoke 240 of FIG. 2B. For example, yoke 804 can include upper and lower projections 810, 812 that can slide within slot 244 of main body 246 of FIG. 2B to rotationally constrain the yoke 804 and can include threads 814 that mate with the focus ring 214 for translating the yoke 804.

Since the magnetic components 808 are fixed to the yoke 804, which is rotationally fixed, the focusing assembly 800 is rotationally fixed within the sleeve 802 relative to the main body 246. The focusing assembly 800 is not keyed to the sleeve 802, so the sleeve 802 can rotate relative to the focusing assembly 800. As such, during rotation of the needle assembly 202 in which the sleeve 802 rotates along with the needle assembly 202, the focusing assembly 800 remains rotationally fixed due to its magnetic coupling with the rotationally fixed yoke 804.

Due to the arrangement of FIG. 8A and FIG. 8B not having a separate magnet carrier, the arrangement of FIGS. 8A-8B can be simpler to manufacture and, therefore, more cost effective relative to the corresponding arrangement of FIG. 2B. However, because the fixed optical components 232 fixedly mounted in the sleeve 802 rotate with the sleeve 220 relative to the one or more optical components 219 of the focusing assembly 800 during rotation of the needle assembly 202, rotation of the needle assembly 202 can cause optical runout issues that would not be caused by the arrangement of FIG. 2B (in which the focusing assembly rotates together with the sleeve and fixed optical components). However, optical runout issues can be mitigated by controlling the positioning of the optical components such that their optical axes are substantially aligned.

Figure 9:
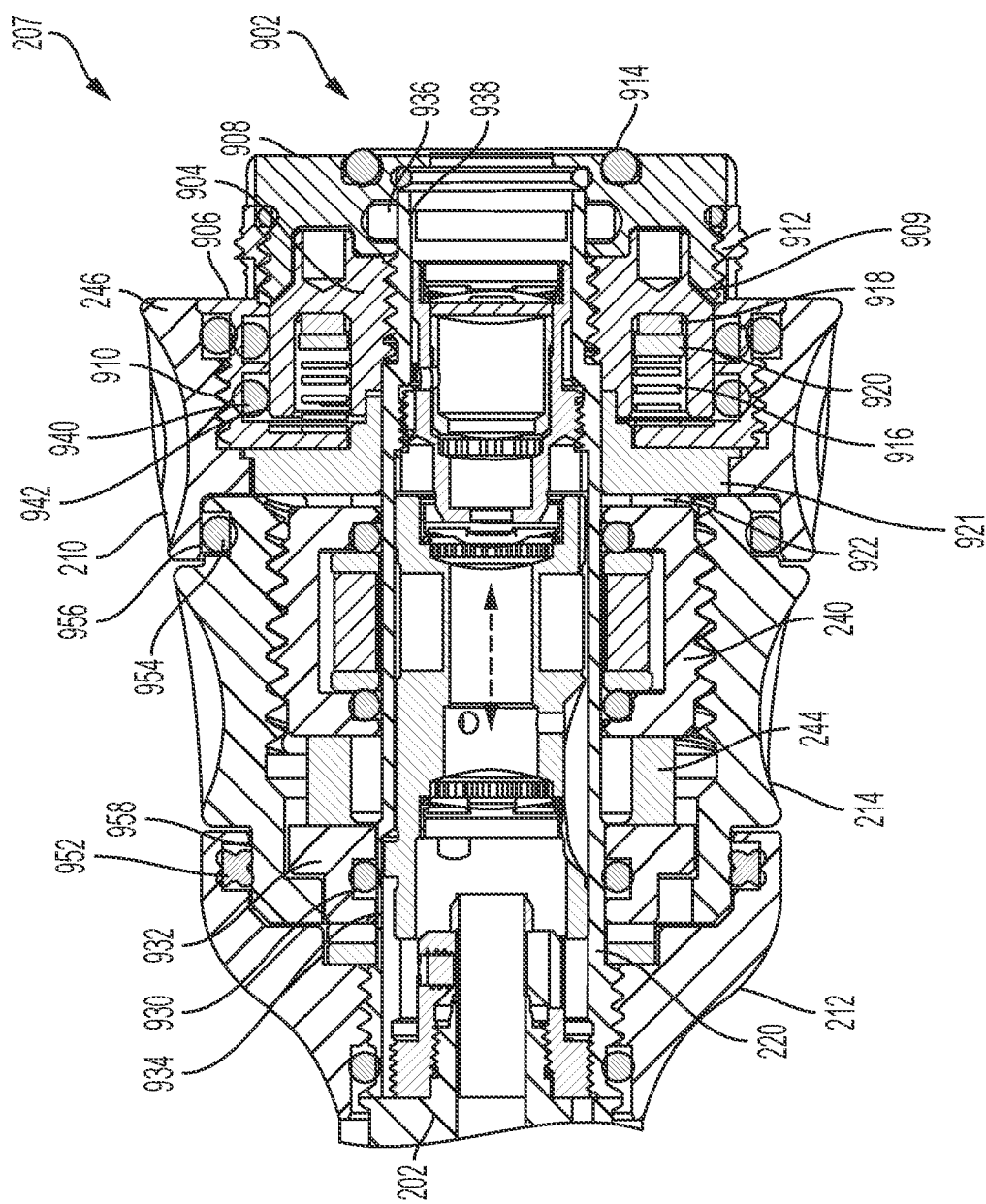
FIG. 9 illustrates various aspects of an exemplary coupling portion.

Additional aspects of the endoscope, In some examples, will be described with respect to FIG. 9 which includes the same cross-section of the coupling portion 207 as provided in FIG. 2B. The sleeve 220 extends centrally through the main body 246 to the proximal portion 902 of the coupling portion 207. The sleeve 220 can be coupled to a mount 904 that can be sandwiched between a retainer 906 and a cap 908 that forms the proximal end of the coupling portion 207. The mount 904 can be coupled to the sleeve 220 such that the two rotate together, such as via a threaded engagement 909. The retainer 906 can be affixed to the main body 246, such as via a threaded engagement 910. The cap 908 can be affixed to the retainer 906, such as via threaded engagement 912. The cap 908 can include a face seal 914 for sealing against a connected camera head. To remove axial play and provide a degree of resistance to rotation of the sleeve 220 and needle assembly 202, a spring 916 can be positioned between the retainer 906 and mount 904 to preload the mount 904 in the proximal direction against the cap 908. The spring 916 can be any suitable spring such as a coil spring or a wave spring. A thrust bushing or bearing 918 can be provided between a spring seat 920 and mount 904 to enable rotation of the mount 904 relative to the spring 916. The mount 904 may bear against one or more surfaces of the cap 908, such as conical surface 909. A plate 921 can be positioned at the proximal end 922 of the slot 244 of the main body 246 and can define the proximal end 922 of the slot 244.

The coupling portion 207 can be configured so that the needle assembly 202 can be readily rotated as desired during use but is not so easily rotated that the needle assembly 202 is unintentionally rotated during use. As noted above, the spring 916 preloads the mount 904 against the cap 908 and the frictional force therebetween provides a degree of resistance to rotation of the sleeve 220 (and attached needle assembly 202). Additional resistance to rotation can be provided by a number of O-rings that can also serve to distribute rotational forces during needle rotation. One or more O-rings 930 can be provided at the distal portion 932 of the main body 246 and positioned against an outer surface 934 of the sleeve 220. One or more O-rings 936 can be located between the cap 908 and the proximal end 938 of the sleeve 220. One or more O-rings 940 can be provided between the retainer 906 and an outer surface 942 of the mount 904.

The coupling portion 207 of the endoscope 200 can be configured such that each of the focus ring 214 and the needle assembly rotating ring 212 can be rotated independently without rotation of one causing rotation of the other. In some examples, a seal 952 seats against a sealing surface 958 of the focus ring 214 to seal between the needle assembly rotating ring 212 and the focus ring 214, and a seal 954 seats against a sealing surface 956 of the graspable ring 210 of the main body 246 to seal between the focus ring 214 and the graspable ring 210 of the main body 246. Rotation of the needle assembly rotating ring 212 imparts a torque on the focus ring 214 that is a function of the frictional force applied by the seal 952 and the radius of the sealing surface 958. This torque is resisted by a torque applied to the focus ring 214 by the seal 954 (in addition to some torque provided by the engagement between the focus ring 214 and the yoke 240), which is a function of the frictional force applied by the seal 954 and the radius of the sealing surface 956. The diameters of the sealing surfaces 956, 958 and/or the configurations of the seals 952, 954 can be selected such that the torque imparted by the seal 952 on the focus ring 214 is less than the torque imparted by the seal 954 on the focus ring 214 such that the focus ring 214 remains rotationally fixed in position during rotation of the needle assembly 202. In such a way, a user can rotate the needle assembly 202 with one hand since the user does not have to simultaneously hold onto the focus ring 214. Rotation of the needle assembly 202 during rotation of the focus ring 214 is resisted by engagements between the O-rings 930, 936, and 940 as well as the friction force resulting from the spring 916.

As noted above, the sleeve houses one or more optical components, such as one or more optical components of the focusing assembly and one or more fixed optical components. The optical components can be any suitable optical components, including one or more windows, lenses, prisms, filters, etc. The optical components can be mounted to respective housings in any suitable fashion, including via mechanical attachment means, adhesive attachment means or a combination thereof. In some examples, a removable retainer is used to retain one or more optical components in place. This can be advantageous over adhesive attachment means, since adhesive can be difficult to remove should replacement of the optical component be necessary and since adhesive may deteriorate over time, causing deposits on optical component surfaces.

FIG. 10A and FIG. 10B illustrate exemplary retainers 1000 and 1050, respectively, that can be used for retaining one or more optical components according to various examples. In FIGS. 10A and 10B, a lens 1080 is positioned against a seat 1082 of a housing 1084, which can be, for example, cylinder 231 of focusing assembly 228. The retainers 1000, 1050 include a main body 1020 that can be press-fitted or threaded into the housing 1084 and can register against a seat 1086 of housing 1084. Retainer 1000 includes one or more circumferentially spaced resilient features 1002 that extend radially inwardly of the main body 1020 and can flex in the longitudinal direction to resiliently push against the lens 1080 when the retainer 1000 is seated against seat 1086 without damaging the lens 1080. In FIG. 10B, a separate spring 1060 is sandwiched between the lens 1080 and a ledge 1052 of the retainer 1050 and provides a similar function as the spring features 1002 of retainer 1000. In some examples, the retainer 1000, 1050 can be removable, which can enable one or more optical components to removed more easily than if an adhesive mounting technique were used. The retainers 1000 and 1050 enable lens retention without the need for adhesives, which can deteriorate over time and cause deposits on surface of optical components.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:
1. An endoscope comprising:
 a connection portion for connecting the endoscope to a camera head;
 a needle assembly;
 a sleeve that is fixed relative to the needle assembly;
 a focusing optic assembly housed within the sleeve and comprising at least one optical component, the focusing optic assembly being translatable relative to the sleeve for adjusting a focus of the endoscope;
 a user-engageable focus ring configured to translate the focusing optic assembly relative to the sleeve;
 a user-engageable rotator operably coupled to the needle assembly and the sleeve and rotatable independently of the user-engageable focus ring to rotate the needle assembly and sleeve relative to the user-engageable focus ring and the connection portion to adjust a view direction of the needle assembly without adjusting the focus of the endoscope;
 wherein the focusing optic assembly is magnetically coupled to a magnetic coupling assembly located externally to the sleeve such that translation of the magnetic coupling assembly translates the focusing optic assembly;
 wherein the user-engageable focus ring is configured to engage the magnetic coupling assembly such that rotation of the user-engageable focus ring causes translation of the magnetic coupling assembly; and
 wherein the user-engageable focus ring and the magnetic coupling assembly engage via one or more pins fixed to one of the user-engageable focus ring or the magnetic coupling assembly and one or more slots in the other of the user-engageable focus ring or the magnetic coupling assembly.

2. The endoscope of claim 1, wherein the focusing optic assembly is rotationally coupled to the sleeve such that the focusing optic assembly is configured to rotate with the sleeve.

3. The endoscope of claim 1, wherein the focusing optic assembly is free to rotate relative to the sleeve.

4. The endoscope of claim 1, wherein the sleeve houses at least one fixed optical component that is translationally and rotationally fixed relative to the sleeve.

5. The endoscope of claim 1, wherein the magnetic coupling assembly comprises at least one magnet that is configured to rotate and translate with the focusing optic assembly.

6. The endoscope of claim 5, wherein the magnetic coupling assembly comprises a translatable component that is rotationally fixed relative to the connection portion and the at least one magnet is rotatable relative to and translatable with the translatable component.

7. The endoscope of claim 6, wherein the connection portion comprises a main body that comprises at least one slot for receiving at least one projection of the translatable component of the magnetic coupling assembly.

8. The endoscope of claim 1, wherein the magnetic coupling assembly comprises at least one magnet that is rotationally fixed relative to the connection portion.

9. The endoscope of claim 1, wherein the user-engageable focus ring and the magnetic coupling assembly engage via one or more threads.

10. The endoscope of claim 1, wherein the focusing optic assembly comprises at least one magnet.

11. The endoscope of claim 1, wherein the user-engageable focus ring is configured to remain rotationally fixed relative to the connection portion while the user-engageable rotator is rotated.

12. The endoscope of claim 1, wherein the sleeve is hermetically sealed to the needle assembly.

13. The endoscope of claim 1, wherein the endoscope is autoclavable.

14. The endoscope of claim 1 wherein the focusing optic assembly comprises a plurality of optical components.

15. The endoscope of claim 1, wherein the needle assembly comprises a light cable connector and the endoscope is configured such that rotation of the user-engageable rotator adjusts a position of the light cable connector relative to the connection portion.

16. The endoscope of claim 1, wherein the needle assembly comprises an angled distal end and rotation of the user-engageable rotator adjusts a view angle of the endoscope.

17. An endoscopic camera comprising a camera head and the endoscope of claim 1, wherein the camera head is connected to the endoscope via the connection portion of the endoscope.

* * * * *